Nov. 18, 1924.
F. B. THOMAS
1,516,066
CAR WHEEL AND HUB CAP THEREFOR
Filed March 22, 1924
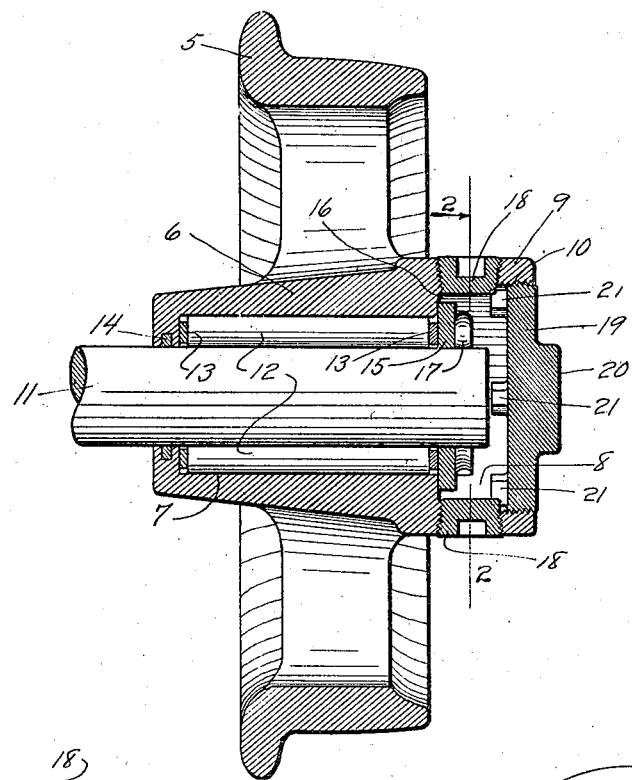
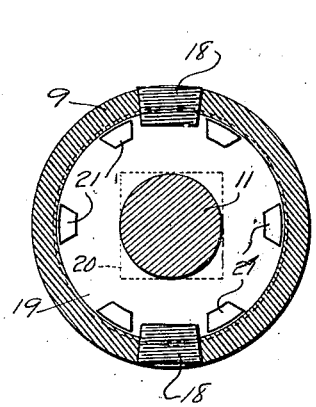
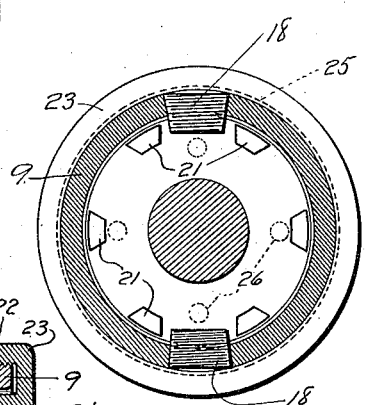
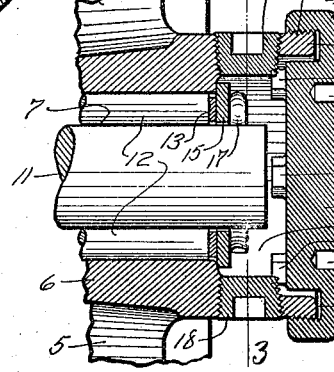
Witness
John B. Dade
Inventor
Franklin B. Thomas.
by Wilkinson & Giesta
his Attorneys Patented Nov. 18, 1924.

1,516,066

UNITED STATES PATENT OFFICE.

FRANKLIN B. THOMAS, OF DENVER, COLORADO.

CAR WHEEL AND HUB CAP THEREFOR.

Application filed March 22, 1924. Serial No. 701,110.

*To all whom it may concern:*

Be it known that I, FRANKLIN B. THOMAS, a citizen of the United States, and a resident of the city and county of Denver, and State of Colorado, have invented certain new and useful Improvements in Car Wheels and Hub Caps Therefor, of which the following is a specification.

This invention relates to improvements in car wheels and hub caps therefor, and particularly embodies a novelly coacting protective cap for the hub of the wheel, associated with the open end of the hub in such a manner as to be retained in detachably interlocked association therewith, whereby the bearings and lubricating reservoir of the wheel are protected against the admission of dust, grit or other foreign substances.

While the invention has been perfected with more especial reference to mine car work, where much dust and loose foreign substances are encountered, it is nevertheless to be understood that the invention is not necessarily to be restricted in use to any one particular field, but may likewise be employed, where feasible, in analogous or other equivalent relations. For simplicity of illustration and brevity of description, however, I will disclose the improvements with more particular reference to mine car wheels, but with the understanding that this is done without imposing any limitations thereon as to the spheres of usefulness, or as to whether the improvements be applied in connection with an actual mine car or other type of wheel.

These mine car wheels as a rule are rotatably mounted upon the end portions of a rigidly fixed axle, suitable antifriction bearings being interposed therebetween, and the outer end of the hub of the wheel provides for a lubricant or grease chamber that supplies the said bearings, as is well understood. In some types of these wheels the outer hub end is closed by an integrally formed head, which is not always most desirable, but when the outer hub end is normally formed open and is closed by a dust and dirt excluding cap, which is then necessary, a common objection thereto is that the cap works loose, or elements securing the same work loose, whereupon the cap drops off and is lost.

It has heretofore been proposed, therefore, to bolt the hub cap in place by a series of bolts extending longitudinally within the hub body, or to otherwise secure the cap by fastening means which are neither a part of the cap nor the hub proper, and all of which entails the use of additional parts, causes substantial expense, and results in considerable loss of time in assembling.

Accordingly, the primary object of my invention has been to devise simple, effective and economical means, avoiding the use of bolts or other extra separate parts liable to become dislodged, for detachably but securely maintaining the hub cap in place, and with these prefacing remarks reference will now be immediately had to the accompanying drawings, forming a part of this disclosure and illustrating a practical embodiment of the improvements, in which drawings—

Figure 1 is a longitudinal sectional view through a mine car wheel with its hub cap attached, as mounted on an axle end, embodying and illustrating the application of my improvements; Figure 2 is a transverse sectional view taken on the line 2—2 of Figure 1; Figure 3 is a transverse sectional view, analogous to Figure 2, but taken on the line 3—3 of Figure 4; and Figure 4 is a fragmentary longitudinal sectional view, analogous to Figure 1, showing the adaptation of the improvements with a slightly different form of hub cap.

The numeral 5 designates a car wheel, of the mine car type, the hub section 6 of which provides for an axial bore 7 that opens to an enlarged annular lubricant reservoir chamber 8, formed at the outer end of the hub by the annular rim extension 9, which latter is open at its outer end and may be internally threaded, for a suitable distance, as indicated at 10.

The axle is designated at 11, the end portions of which axle are encompassed by suitable antifriction bearing elements, shown as roller bearings 12, contained within the axial bore 7, and end steel washers or spacing rings therefor are indicated at 13.

The construction also shows a washer 14, of felt or other suitable material, to prevent the lubricant from working out of and escaping from the inner end of the hub bore.

15 designates a replaceable wear ring or larger washer for the axle end, which wear ring is adapted at its inner face to seat up against the annular face 16, of the shoulder formed between the axial bore 7 and the annular rim extension 9, and the outer face of said wear ring is engaged by a cotter pin 17 passing through the axle end, by means of all of which the mounting of the wheels will be clearly understood.

The annular rim 9, or peripheral wall of the lubricant reservoir chamber 8, is provided with a plurality or radial threaded openings, two being actually shown and illustrated as being diametrically opposed, whereby the cotter pin 17 may be facilely reached, the said openings being adapted to receive the threaded plug closures 18, and through which openings the desired lubricant is customarily introduced, into the chamber 8 for filling up the same, by means of a grease gun.

With my particular improvements, these closure plugs 18 are made long enough to project at their inner ends substantially within the reservoir chamber 8, and they thereby additionally function further as limiting means or interlocking stops, as will hereinafter appear, to interlock the hub cap with the hub rim 9, and detachably maintain the same against independent or relative rotation.

At Figures 1 and 2, the said hub or dust cap is shown simply as a peripherally threaded disk closure 19, with a wrench applying boss 20 projecting from its outer face, but on its inner face it is provided with a plurality or series of equidistantly spaced and circumferentially disposed lugs 21, six being shown on the drawings, and the spaces between these lugs should be slightly greater than the diameter of the inwardly projecting ends of the closure plugs 18, to provide a clearance space to receive the said plug ends between a complementary pair thereof.

Figures 3 and 4 differ from Figures 1 and 2 in that the hub rim 9, instead of being internally threaded as at 10, is in fact externally threaded as at 22 to receive the internally threaded flange or rim 23 of a modified form of hub cap 24, the inner face of which may be annularly recessed, as at 25, to form its inturned flange or rim 23. The inner face of the modified form of hub cap disk 24, however, is provided as heretofore with the circumferentially disposed series of spaced lugs 21. Of course the same idea would be involved if the disk cap 24 were not so thick, or in other words that its central portion be chambered out to the depth of the annular recess 25, providing for a thin disk simply with its encompassing inturned rim 23, although in such event the lugs 21 would have to be made slightly longer to project into the path or zone of the plugs 18. This modified form of hub cap 24 is also shown with paired sockets 26, formed in its outer face, for the application of a spanner wrench or tool, which feature could be analogously supplied on the hub cap 19, of Figures 1 and 2, in substitution for the boss 20, and vice versa.

The drawings show the threaded plugs 18 of tapering standard form, although they could be cylindrical, and when so tapering it might be more advantageous to omit the threads from the extreme lower peripheral face, or that portion which projects into the reservoir chamber 8, whereby a smooth conical surface would be provided to function as a rotary wedge, for engaging an adjacent beveled face of one of the lugs 21, and thus turn the hub cap slightly in the event that the space between a complementary set of the paired lugs, is not exactly aligned relatively to the plug. However, the cap could be suitably marked to indicate when the clearance space, between the paired lugs, properly registers relatively to a plug 18. Also, while I have shown a pair of diametrically opposed plugs 18, and which may be preferable, the improvements would nevertheless successfully operate if one or even more than two of such plugs were employed. Furthermore, the paired lugs 21 could be of a greater or less number than as actually shown, dependent largely upon the diameter of the plugs 18, the essential feature being that the clearance space between the paired lugs 21 should be of appropriate dimensions to properly receive a plug 18 therebetween.

From all of the foregoing it will be obvious that, in assembling, the hub cap is threaded to the rim 9 when the inner ends of the plugs 18 are withdrawn from the chamber 8, and that upon screwing home the hub cap, with complementary sets of the paired lugs 21 properly located relatively to their plugs 18, then the plugs 18 may likewise be screwed up tightly, to cause their inner projected ends to enter the clearance space between their complementary paired lugs which, being disposed in the path or zone of the said plugs, obviously prevents the rotation of the hub cap, and the latter is thereby interlocked with the hub rim 9 by means of a plug or plugs 18 coacting with complementary paired lugs 21.

With the circumferentially disposed series of equidistantly spaced lugs on the hub cap, it will be apparent that one of the aforesaid clearance spaces, for the reception of a plug 18, will be formed between each lug 21 and the immediately preceding and succeeding lugs of the series, so that when the hub cap is screwed up substantially home, it may still be turned slightly one way or the other, causing one or more of said clearance spaces, dependent upon the number of plugs employed, to be facile positioned for receiving its complementary plug, whereafter only a very limited and negligible circumferential play of the hub cap would be permitted, if there be any such play at all.

While my improved means, of detachably but positively securing the hub cap against displacement, may not appear to be an invention of major magnitude, still it does away with all extra separate parts, and the full advantages of the improvements will be and have already been largely recognized by those cognizant of the needs of the mining industry especially.

Having thus completely disclosed my improvements, and the functioning thereof, what I claim as new and patentable is:—

1. The combination of a wheel having an annular hub extension that is open at its outer end and forms a lubricant reservoir chamber with a peripheral inlet opening thereto, a detachable plug for said inlet opening of sufficient length to project within said chamber, and a hub cap for threaded attachment to said annular extension to close said outer open end thereof, which hub cap is provided with a suitably spaced pair of lugs for extending within said chamber, in association with said inlet opening, to receive the projected end of said plug therebetween.

2. The combination of a wheel having an annular hub extension that is open at its outer end and forms a lubricant reservoir chamber with a peripheral inlet opening thereto, a detachable plug for said inlet opening of sufficient length to project within said chamber, and a hub cap for threaded attachment to said annular extension to close said open outer end thereof, which hub cap is provided with a circumferentially disposed series of suitably spaced lugs for extending within said chamber, in paired association with said inlet opening, to complementally receive the projected end of said plug therebetween.

3. The combination of a wheel having an annular hub extension that is open at its outer end and forms a lubricant reservoir chamber with a plurality of peripheral inlet openings thereto, detachable plugs for said inlet openings of sufficient length to project within said chamber, and a hub cap for threaded attachment to said annular extension to close said open outer end thereof, which hub cap is provided with a circumferentially disposed series of suitably spaced lugs for extending within said chamber, in complementally paired association with said inlet openings, to receive the projected ends of said plugs therebetween.

4. The combination of a wheel having an annular hub extension that is open at its outer end and forms a lubricant reservoir chamber with a peripheral inlet opening thereto, a detachable plug for said inlet opening of sufficient length to project within said chamber, and a hub cap for threaded attachment to said annular extension to close said open outer end thereof, which hub cap is provided with a circumferentially disposed series of equidistantly spaced lugs for extending within said chamber, in complementally paired association with said inlet opening when turned to that position, to receive the projected end of said plug therebetween.

5. The combination of a wheel having an annular hub extension that is open at its outer end and forms a lubricant reservoir chamber with a plurality of peripheral inlet openings thereto, detachable plugs for said inlet openings of sufficient length to project within said chamber, and a hub cap for threaded attachment to said annular extension to close said open outer end thereof, which hub cap is provided with a circumferentially disposed series of equidistantly spaced lugs for extending within said chamber, in complementally paired association with said inlet openings when turned to the positions thereof, to respectively receive the projected ends of said plugs therebetween.

6. The combination of a wheel having an annular hub extension that is open at its outer end and forms a lubricant reservoir chamber with a peripheral inlet opening thereto, a detachable plug for said inlet opening of sufficient length to project within said chamber, and a hub cap for threaded attachment to said annular extension to close said open outer end thereof, which hub cap is provided with suitable means for interlocking connection with the projected end of said plug when said hub cap is screwed home and the said plug projected within said chamber.

7. The combination with a non-rotatable axle, of a mining car wheel rotatably mounted in antifriction relation thereon, the hub section of said wheel having an enlarged annular extension, open at its outer end and at its inner end forming an annular shoulder face with said hub section, which said annular extension provides for a lubricant reservoir chamber with a peripheral inlet opening thereto, a wear ring encompassing the axle end portion, a cotter pin through said axle end adjacent the outer face of said wear ring, the inner face of said wear ring being associated with said annular shoulder face, a plug for threading through said inlet opening, and a hub closure cap for threaded attachment to said annular extension, which said hub cap is provided with suitable means for interlocking connection with said plug when said cap and finally said plug are screwed up home.

In testimony whereof, I affix my signature.

FRANKLIN B. THOMAS.